US006047835A

United States Patent [19]

Birken et al.

[11] Patent Number: 6,047,835

[45] Date of Patent: Apr. 11, 2000

[54] CLEARING DEVICE FOR A CENTRIFUGAL SEPARATOR

[75] Inventors: Lionel Birken, Lyons; Vincent Vitry, Saint-Priest, both of France

[73] Assignee: Robatel, Genas, France

[21] Appl. No.: 09/166,096

[22] Filed: Oct. 5, 1998

[30] Foreign Application Priority Data

Oct. 13, 1997 [FR] France .................................. 97 13001

[51] Int. Cl.[7] ..................................................... B01D 33/46

[52] U.S. Cl. ................... 210/372; 210/360.1; 210/380.1; 210/369; 210/372; 210/373; 210/374; 210/396; 210/238

[58] Field of Search ............................. 210/360.1, 380.1, 210/369, 372, 373, 374, 238, 375, 396

[56] References Cited

U.S. PATENT DOCUMENTS 5,607,588 3/1997 Peterson ................................. 210/396

FOREIGN PATENT DOCUMENTS 0 648 542 A1 4/1995 European Pat. Off. .

35 18 648 A1 11/1986 Germany .

*Primary Examiner*—David A. Reifsnyder

*Attorney, Agent, or Firm*—Oliff & Berridge, PLC

[57] ABSTRACT

A clearing device for a centrifugal separator holds a cake on a filtering medium lining at least the perforated part of a rotating basket. The clearing device includes several clearing members which, when arranged at rest, are more or less parallel to the generatrices of the perforated wall of the basket and between this wall and the filter medium, are spaced angularly, each clearing member resting, via one of its ends, on one wall of the basket and being equipped, at the other end, with a control means capable of receiving a longitudinal compressive force which, by deforming the clearing members causes the formation of at least one convex projection which locally deforms the filtering medium. The clearing device also includes actuating means capable of coming into contact with the control means of each clearing member to shift it in the direction for forming the projection.

12 Claims, 4 Drawing Sheets

CLEARING DEVICE FOR A CENTRIFUGAL SEPARATOR

BACKGROUND OF THE INVENTION

The present invention relates to a clearing device that enables some or all of a cake held on the filtering medium of a basket of a centrifugal separator to be broken up.

There are known devices which allow the cake to be removed gradually using the cutting element of a scraper or of a knife. These devices do not allow the entire cake to be extracted because the cutting element must not come into contact with the filtering medium in order not to damage it. That part of the cake which remains in the basket after this stage is known as the residual layer.

More and more often, this residual layer has to be removed because it slows down the filtration which follows or because the user wishes to recover all of the product or not to mix two batches or two different products.

There are already known devices which allow this residual layer to be removed, but these all have their limit or significant shortcomings.

The residual layer may be removed manually using an appropriate tool. This operation absolutely has to involve shutting down and opening the machine. It may therefore prove dangerous to the operator who may come into contact with toxic or inflammable products. What is more, the product may deteriorate when it comes into contact with the open air. Finally, this technique is lengthy and entails the presence of an operator.

Without opening and without shutting down the machine, it is possible to clear away the residual layer by spraying a gas or liquid under pressure. This technique is effective only in about 50% of cases depending on the characteristics of the solid. The spraying of liquid additionally presents the disadvantage of reintroducing liquid onto the product from which liquid has been separated. This option is therefore used only in a few specific instances. The use of mechanical clearing accessories that come into contact with the fabric is only very limited because contact with this scraper damages the filtering medium.

In DE-A-35 18 648 and EP 0 648 542, a flexible and elastically deformable expanding element is inserted between the perforated trough and the filtering medium. When this flexible element is pressurized, the filtering medium is shifted, which causes the cake to be destroyed. This device is suited only to the removal of the residual layer. There are many solvents with which it cannot be used.

Finally, some separators allow the entire cake to be disintegrated and unloaded solely through the movement of the filtering medium. These are, for example, the socalled inversion or fabric-pulling separators. In both instances, the fabric is highly stressed, the size of the machine is fairly limited and the mechanisms are complicated and therefore expensive.

SUMMARY OF THE INVENTION

The object of the present invention is to provide a clearing device which overcomes the drawbacks of the known devices.

The device according to the invention comprises, on the one hand, several clearing members which, when arranged at rest, more or less parallel to the generatrices of the perforated cylindrical wall of the basket and between this wall and the filter medium, are spaced angularly, each member resting, via one of its ends, on one wall of the basket and being equipped, at the other end, with a control means capable of receiving a longitudinal compressive force which, by deforming the member causes the formation of at least one convex projection which locally deforms the filtering medium, and, on the other hand, actuating means capable of coming into contact with the control means of each clearing member to shift it in the direction for forming the projection.

This device makes it possible to break up the residual layer or the cake by exerting on the clearing members, with the basket stationary or rotating at low speed, a longitudinal force which causes them to flex or bend toward the central part of the basket.

Depending on the embodiment, this device can be actuated manually or automatically.

Advantageously, associated with each clearing member is a rigid plate which, extending over at least part of the length of this member, is inserted between this member and the filtering medium.

During the clearing, each rigid plate shifts like a piston under the thrust imparted to it by the clearing member. Depending on its profile and means of attachment, the radial force imparted by this member is more or less the same over the entire length of the rigid plate, or is biased toward one side or the other, which encourages the residual layer or the cake to break up over the entire width of the basket or to break up more on one side or on the other.

Other features and advantages will emerge from the description which follows with reference to the appended diagrammatic drawing depicting, by way of example, a number of embodiments of the device according to the invention in the case of its being applied to a centrifugal separator of vertical axis of rotation.

DETAILED DESCRIPTION OF PREFERRED EMBODIMENTS

Figure 1:
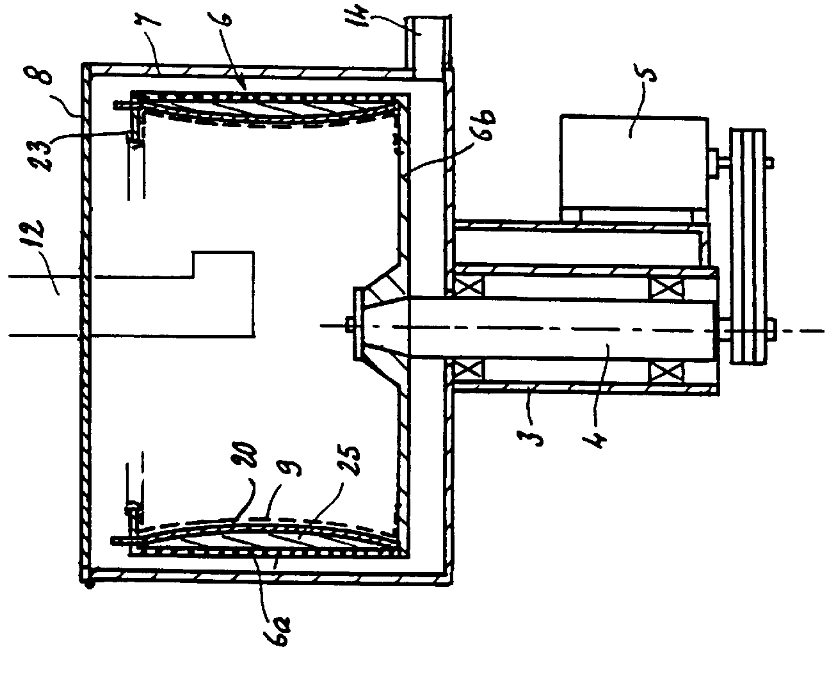
FIG. 1 is a side view in partial cross section of a centrifugal separator equipped with the device.

In FIG. 1, the numerical reference 3 denotes a bearing for a vertical shaft 4, 5 denotes the motor driving the shaft and 6 denotes a perforated basket wedged onto one end of this shaft and mounted so that it can rotate freely in a stationary tank 7, accessible via a hatch 8.

In the known way, the cylindrical wall 6a of the basket is perforated and is secured to a more or less diametral wall 6b and to a ring-like surround 23. The perforated wall 6a is lined with a filtering medium such as a bag 9, possibly supported by a backing fabric 10 (FIG. 2) inserted between it and the perforated wall 6a. The hatch 8 supports a pipe 12 for supplying liquid and solid mixture. The tank 7 is connected to a circuit 14 for collecting the liquid separated from the solid by centrifuging.

Figure 2:
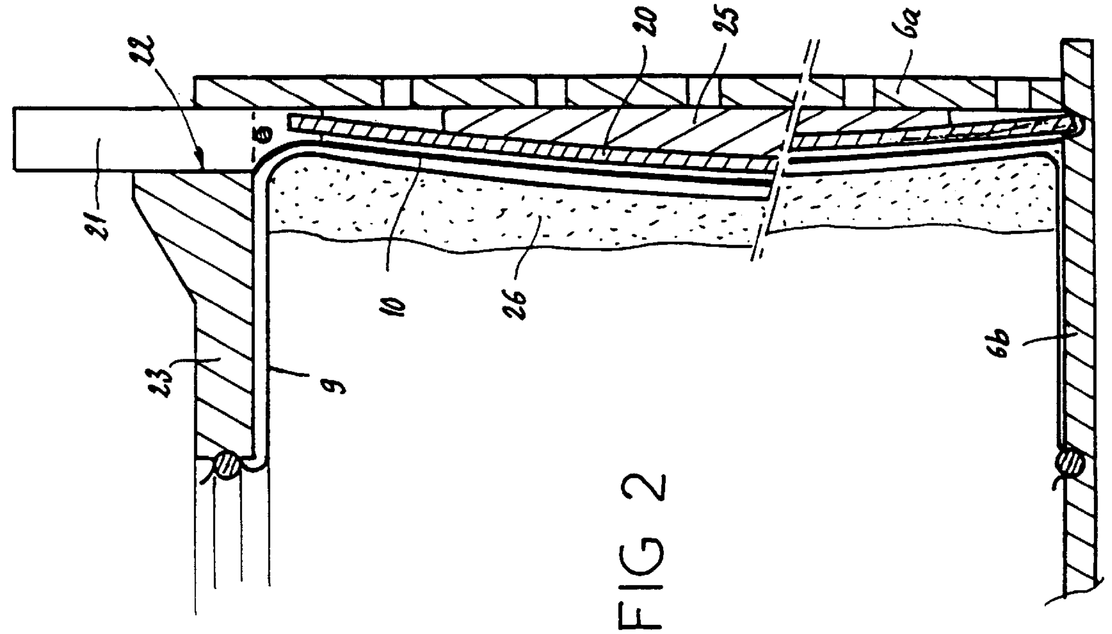
FIGS. 2 and 3 are part views in longitudinal section of a first embodiment of the device when it is in the position of rest and in the clearing position, respectively.
Figure 3:
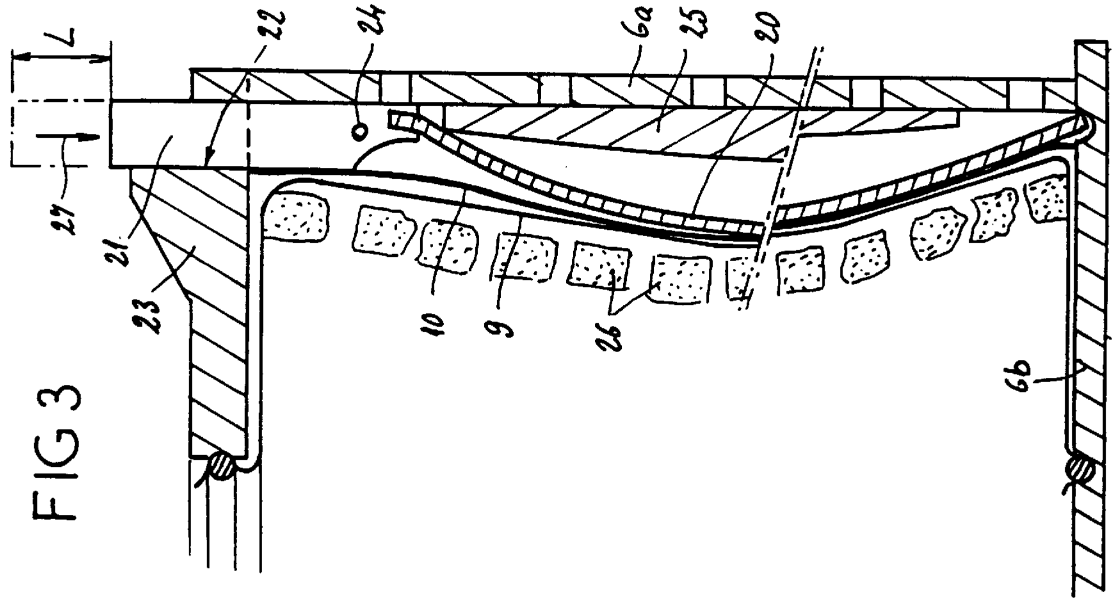

As shown in a first embodiment in FIGS. 2 and 3, the clearing device according to the invention is made up of several leaves 20 arranged parallel to the genenratrices of the basket 6 between the perforated wall 6a and the filtering medium 9 or the backing fabric 10, if the basket has one. The various leaves are spaced angularly inside the basket, with an angular spacing which may or may not be constant. Each leaf 20 is preferably made of an elastically deformable material, such as a metal or a synthetic substance.

This material may also be inelastically deformable, in which case it resumes its shape by centrifuging, when the basket is rotated again.

The width of a leaf is generally between 2 and 4 centimeters and its length is more or less equal to that of the basket. For certain applications, the material of which the leaf is made is chosen to suit its chemical resistance to the treated product, it being possible for this resistance to be increased by depositing a coating on the leaf.

Each leaf 20 rests, via one of its ends, on one wall of the basket, for example the one 6b which provides the connection between this basket and the rotary shaft 4, while its other end is connected to control means capable of imparting to it a longitudinal compressive force which causes it to deform and more specifically to flex toward the inside of the basket.

In the embodiment depicted in FIGS. 2 and 3, the free end of the leaf 20 rests on a cylindrical peg 21, mounted to slide in a bore 22 formed in the ring-like surround 23.

Figure 9:
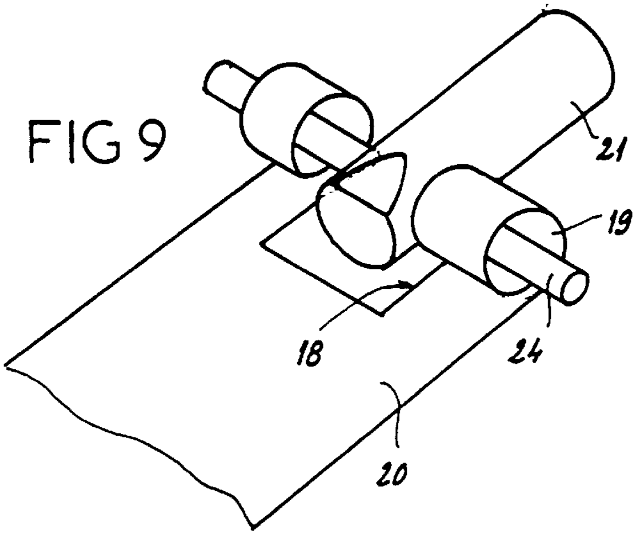
FIG. 9 is a part view in perspective of one embodiment of a deformable leaf secured to its peg.

As shown in greater detail in FIG. 9, the end of the peg 21 at least partially enters a cutout 18 therein in order to provide wedging against transverse translation. In the embodiment depicted, the edges of the cutout 2 are rolled over to form two lugs 19 used for attaching a transverse pin 24 which, by coming up to rest against the internal face of the ring-like surround 23 under the action of the elastic return provided by the leaf, limits the outward translational travel of this leaf. In an alternative from, this limitation is provided by a shoulder on the peg 21.

In a position of rest, the peg 21 is in the position depicted in FIG. 2 and forms, via its external end, a projection capable of interacting with actuating means which are described later.

Each leaf 20 is advantageously associated with means causing its pre-flexing, that is to say causing it to bow toward the filtering medium 9.

In the embodiment depicted in FIGS. 2 and 3, these means consist of a convex support 25 placed under each leaf and fixed to the perforated wall 6a of the basket. This support extends at least over part of the length of the leaf.

In another embodiment, not depicted, the pre-flexing means consist of a dog inserted between the basket and the clearing member, and fixed to this basket or to this member.

Using this device, once the operation of separating solid from liquid is over, and after stopping the centrifuge basket, all that is required, in order to break up the cake 26 which has accumulated against the filtering medium 9, is for a longitudinal displacement to be imparted to each peg 21 in the direction of the arrow 27 in FIG. 3 so that by pressing on the free end of the leaf 20, this leaf bows into a convex bulge which, within the basket, pushes on the fabric backing 10 and the filtering medium 9 in contact with it and causes the cake 26 to break up.

Figure 8:
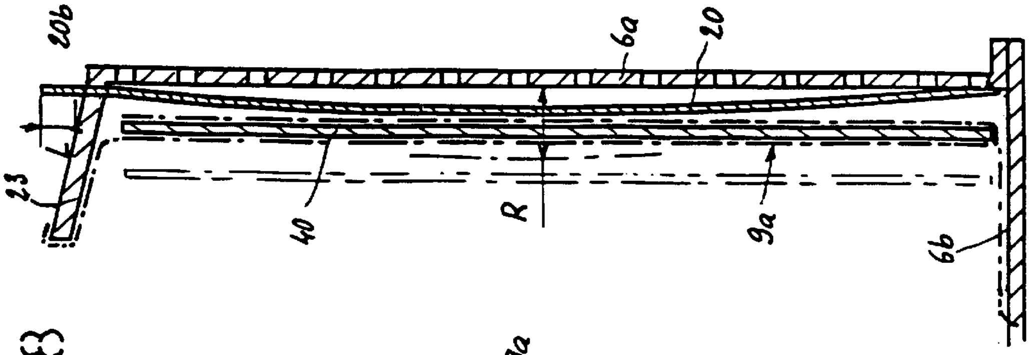
FIG. 8 is a part view in longitudinal section showing a separator equipped with the bag of FIG. 7, when at rest.

FIG. 8 clearly shows that for a short longitudinal travel "L" of the leaf, the radial travel "R" [lacuna] this leaf in its central region has a higher value.

When the force on the peg 21 is released, the elasticity of the leaf 20 returns the leaf and the peg to their initial position of rest. When the machine is started up again, the centrifugal effect also contributes to returning the entire device to its position of rest.

Figure 5:
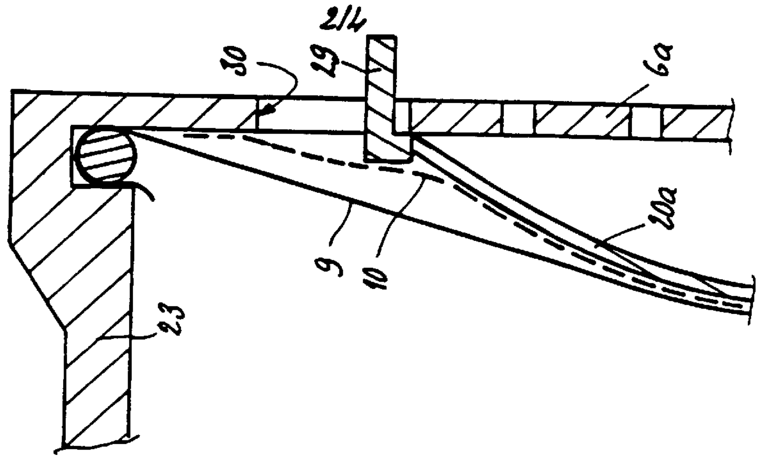
FIGS. 4 and 5 are part views in longitudinal section showing another embodiment of the device when it is, respectively, in the position of rest and in the clearing position.
Figure 4:
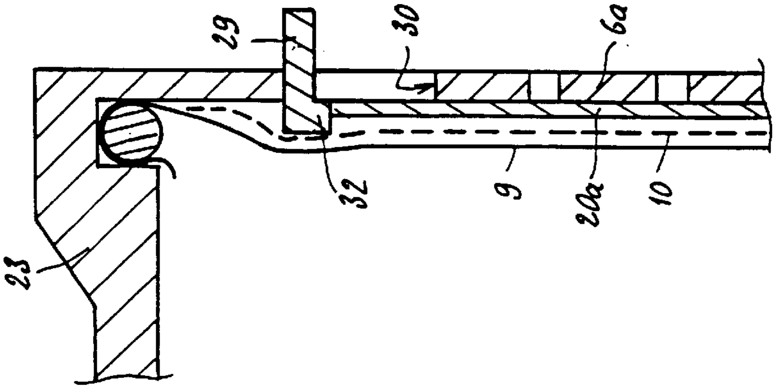

The embodiment depicted in FIGS. 4 to 5 differs from the previous one in the means controlling the bowing of each leaf 20a. These means consist, for each leaf 20a, of a more or less radial peg 29 mounted to slide in a longitudinal slot 30 in the basket.

That end of the peg 29 which is inside the basket is equipped with a shoulder 32 via which it rests on the end of the leaf 20. That end of the peg which is outside the basket 6, forms a projection which can be moved by actuating means. Apart from these differences, this clearing device is similar to the one described previously.

In an alternative form shown in FIG. 8, the free end 20b of each leaf 20 passes through a slot in the surround 23 and forms, via its part projecting from this surround, the means of controlling and therefore of bowing this leaf.

Each of the devices just described is also associated with actuating means, which may be either manual or automatic.

Figure 6:
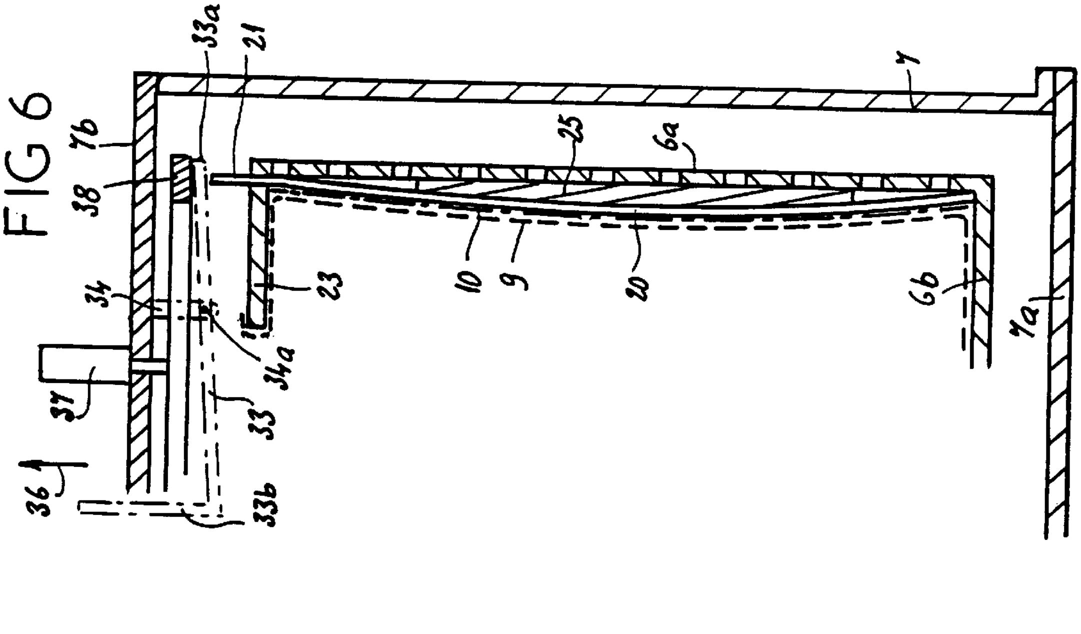
FIG. 6 is a part view in longitudinal section showing two embodiments of the means of actuating the device.

FIG. 6 shows in chain line that, in one embodiment, the means of actuation are manual and consist of a removable or fixed lever 33. If it is removable, it comprises, between its ends, a projecting leg via which it can rest on a return of the tank once it has been introduced into this tank through the hatchway. If it is permanently fixed, it is articulated between its ends to a spindle 34a borne by a leg 34 projecting from a return 7b of the tank 7.

One of the ends 33a lies facing the circular path of the control means, pegs 21 or the end 20b of the leaf, while its other end 33b constitutes a handle for manual operation when shifted in the direction of the arrow 36.

By shifting the lever in the direction of the arrow 36, the operator causes the leaf 20 to flex and brings about clearing. This operation is repeated for each leaf or clearing member.

It should be emphasized that the control means which, in the embodiments depicted are situated on the same side as the hatch 8, may also be situated on the same side as the wall 7a of the tank 7.

In another embodiment, not depicted, the wall 7a of the tank 7 or its hatch 8 bears pneumatic hydraulic rams, inflatable cushions or other expandable means arranged at the same angular spacing as the pegs 21 which face them. Thus, having positioned the basket so that the pegs are opposite these actuating means, supplying these rams or cushions allows the pegs to be displaced and causes the clearing leaves to be made to bow.

In another embodiment depicted in FIG. 6, rams 37, of which there are two or more, borne by the hatch 8, by its frame or by the wall 7a cause the longitudinal shifting of a ring 38 placed opposite the control means 21 or 20b, between a position of rest in which it is some distance from the control means and a clearing position in which it rests on these means.

This solution offers the advantage of avoiding having to position the perforated basket in order to perform the clearing operation. The rams 37 may be pneumatic or hydraulic, may consist of an inflatable cushion or may consist of any other expansion means.

In an alternative form, not depicted, the ring 38 is borne by the basket 6 with the possibility of longitudinal sliding with respect to it. In that way, the actuating means which are fixed to the tank 7 or to the hatch and which, for example, are equipped with rollers which come into contact with the ring, can actuate this ring even while it is being rotated at low speed.

In the embodiments described above, the clearing members form, when actuated, a single projection which deforms the filtering medium more or less mid-way along its length. This means that the cake is subjected to forces that are strong enough to break it up only in its central region and not at its edges.

To overcome this, each clearing member is associated with a rigid plate 40 which extends at least over part of the length of the filtering medium.

Figure 7:
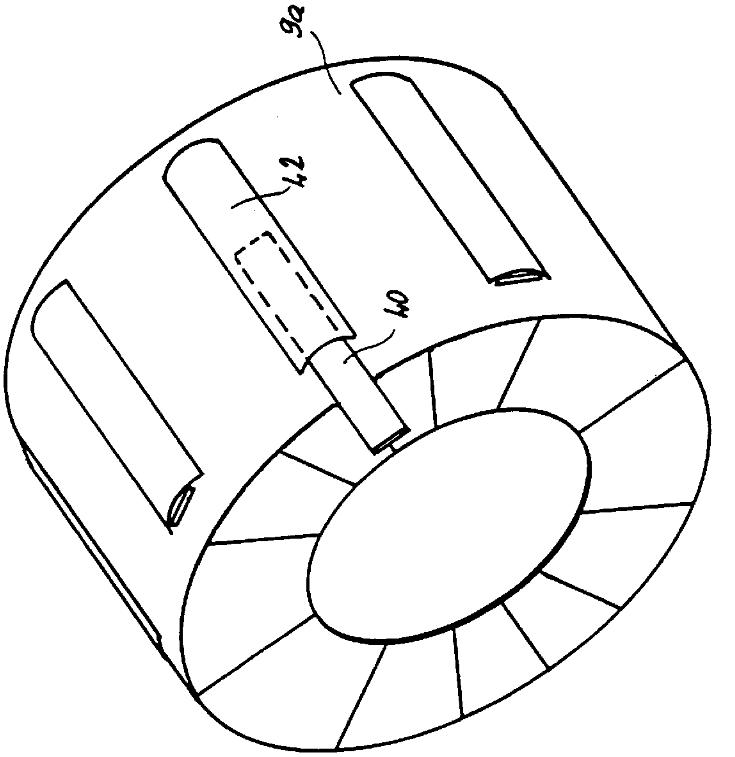
FIG. 7 is a perspective view showing one particular embodiment of a bag filter.

In FIGS. 7 and 8 the rigid plates 40 are fixed in pockets 42 formed in a bag filter 9*a*.

When this bag filter 9*a* is fitted into the perforated basket 6 it is angularly positioned in such a way that each of its leaves 40 is made to coincide with a deformable leaf 20.

During the clearing, the deformation of each leaf 20 acts on the rigid plate 40 in the manner of a piston, so that the radial force of breaking up the cake is spread approximately uniformly over the length of the plate 40 and improves the fragmentation of this cake.

The pockets 42 may be replaced by rigid runners or any other means providing their connection with the bag 9*a*.

Figure 10:
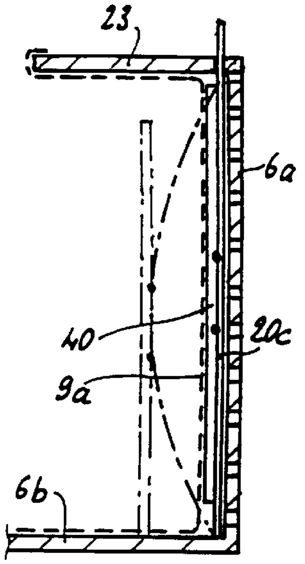
FIG. 10 is a part view in longitudinal section showing another embodiment in which the rigid plate is secured to the clearing leaf.

Each plate 40 which is inserted between the clearing member 20 and the filtering medium 9*a* may also, as shown in FIG. 10, be fixed to the member and in this as shown in FIG. 10, be fixed to the member and in this case to a leaf 20*c*, or to the fabric backing 10, if there is one.

Figure 11:
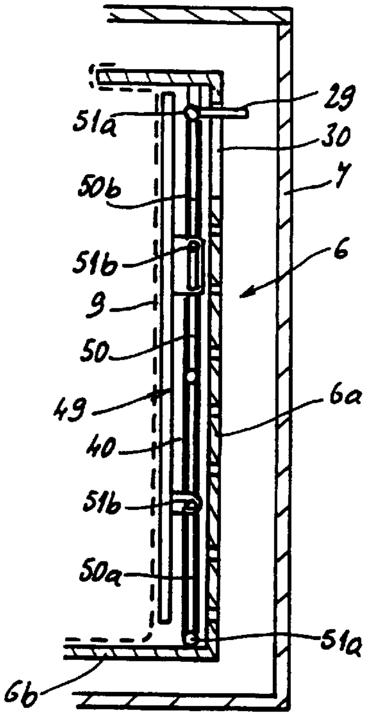
FIGS. 11 and 12 are part views in longitudinal section showing another embodiment of the clearing members.
Figure 12:
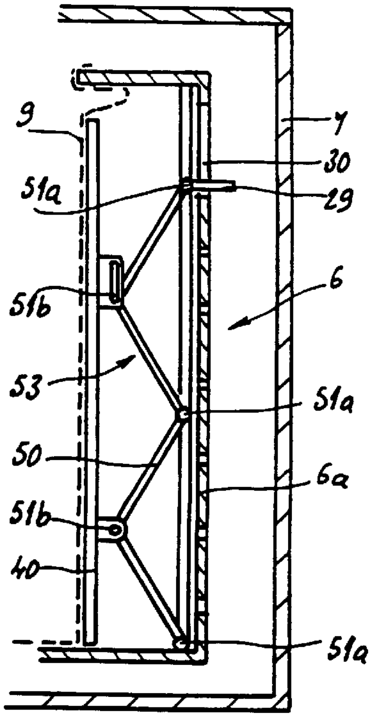

In another embodiment depicted in FIGS. 11 and 12, each clearing member 49 consists of several rigid elements 50 joined together in the manner of a chain and of articulations 51*a* and 51*b*. The end element 50*a* is connected by its articulation 51*a* to the wall 6*b* of the basket, while the other end element 50*b* is secured to a control means such as a radial peg 29 sliding in a slot 30 in the basket 6. There is an even number of elements, and every alternate articulation (the articulations 51*a*) interacts with means of guidance in longitudinal translation, such as slideways fixed against the perforated wall 6*a* of the basket.

The free articulations 51*b* may be connected to a rigid plate 40. In the position of rest, the elements of each member are more or less aligned, as shown in FIG. 11. In practice, the articulations 51*b* are always closer to the axis of rotation of the basket than the one 51*a*, which means that under the control force, the elements 50 of each pair part to form a corner which always projects toward the inside of the basket, as shown in FIG. 12, rather than outward.

By increasing the number of elements of which each member is composed, it is possible to increase the number of projections 53 acting on the filtering medium 9, to make it easier to clear.

The control means may be any one of the types described earlier, namely a removable or fixed manually operated lever, ram or expandable element, acting directly or via a ring.

The device described may be applied to all cyclic centrifuges, of vertical or horizontal axis rotation, whether or not these be fitted with a scraper or a knife, whether they be of the bag, sack, inversion or fabric pulling type.

For centrifuges equipped with a scraper or with a knife, the device makes it possible to break up the residual layer when scraping is complete.

For bag or sack type centrifuges with fabric inversion, this device allows the entire cake to be broken up and makes unloading easier.

Regardless of its application, the device employs means which are simple, reliable and inexpensive and therefore considerably improve the conditions for the extraction of the cake.

We claim:

1. Clearing device for a centrifugal separator in which a cake is held on a filtering medium lining at least a perforated wall of a rotating basket, the device comprising:

a plurality of clearing members which, when arranged at rest, are generally parallel to the generatrices of the perforated wall of the basket, the clearing members being spaced angularly between the perforated wall and the filtering medium, each clearing member resting via one end on one end wall of the basket and being equipped at the other end with a control means capable of receiving a longitudinal compressive force which, by deforming each clearing member, causes the formation of at least one convex projection which locally deforms the filtering medium; and actuating means capable of coming into contact with the control means of each clearing member to shift the clearing members in a direction for forming the projection.

2. Clearing device according to claim 1, wherein each clearing member comprises a deformable leaf associated with pre-flexing means which causes the leaf, at rest, to bow toward the filtering medium.

3. Clearing device according to claim 2, wherein the leaf is made of an elastically deformable material.

4. Clearing device according to claim 1, wherein each clearing member comprises several rigid elements articulated together in the manner of a chain by articulation members, each alternate one of the articulation members being guided in terms of longitudinal translation with respect to the basket, while the other articulation members are free, and wherein each clearing member is capable of occupying a position of rest in which the respective rigid elements are generally aligned against the cylindrical wall of the basket, and a clearing position, in which each pair of respective rigid elements forms a projecting comer.

5. Clearing device according to claim 1, wherein the control means for each clearing member comprises a cylindrical peg mounted to slide in a bore formed in a wall of the basket, one end of the control means protruding beyond the wall and the other end of the control means either resting on a free end of the clearing member or being connected to the clearing member.

6. Clearing device according to claim 1, wherein the control means of each clearing member comprises a generally radial peg mounted to slide in a longitudinal slot in the basket, one end of the peg being situated inside the basket and resting on a free end of the clearing member or being connected to the free end, while the other end of the peg projects out of the basket.

7. Clearing device according to claim 1, wherein the actuating means acting on the control means of each clearing member comprises a removable or fixed lever resting, between its two ends, on a wall of the tank and comprising an end arranged facing the control means and another end equipped with a handle for manual operation.

8. Clearing device according to claim 1, wherein the actuating means comprises a ring which, placed opposite the control means, is borne by expansion means capable of shifting the ring between a position of rest in which the ring is some distance from the control means, and a clearing position in which the ring rests on the clearing member in order to cause the clearing member to deform.

9. Clearing device according to claim 1, wherein a rigid plate is associated with each clearing member, each rigid plate extending over at least part of the length of the respective clearing member and inserted between the respective clearing member and the filtering medium.

10. Clearing device according to claim 9, wherein each rigid plate is placed in a pocket formed in the filtering medium.

11. Clearing device according to claim 9, wherein each rigid plate is fixed to the respective clearing member.

12. Clearing device according to claim 9, wherein each rigid plate is fixed to a fabric backing inserted between the clearing members and the filtering medium.

* * * * *